United States Patent [19]

Staebler

[11] 4,116,265
[45] Sep. 26, 1978

[54] HEAT EXCHANGER HAVING CONTROLLABLE CLEANING MEANS

[75] Inventor: Paul J. Staebler, Dunlap, Ill.

[73] Assignee: Caterpillar Tractor Co., Peoria, Ill.

[21] Appl. No.: 809,723

[22] Filed: Jun. 24, 1977

[51] Int. Cl.² .............................................. F28F 27/00
[52] U.S. Cl. .................................. 165/95; 180/54 A;
180/68 P; 180/68 R; 165/103
[58] Field of Search ................ 165/103, 95, 119, 151,
165/35; 180/54 A, 68 P, 68 R

[56] References Cited

U.S. PATENT DOCUMENTS

| 1,378,715 | 5/1921 | Nielsen et al. ......................... 165/95 |
| 3,522,841 | 8/1970 | Papalexiov ............................ 165/103 |
| 3,627,033 | 12/1971 | Ringquist ........................ 165/103 X |

Primary Examiner—Charles J. Myhre
Assistant Examiner—Theophil W. Streule, Jr.
Attorney, Agent, or Firm—Frank L. Hart

[57] ABSTRACT

A heat exchanger has a plurality of angularly oriented and spaced cooling cores. Closure means is provided for controllably opening and closing the space between the cores for cleaning the cores.

7 Claims, 8 Drawing Figures

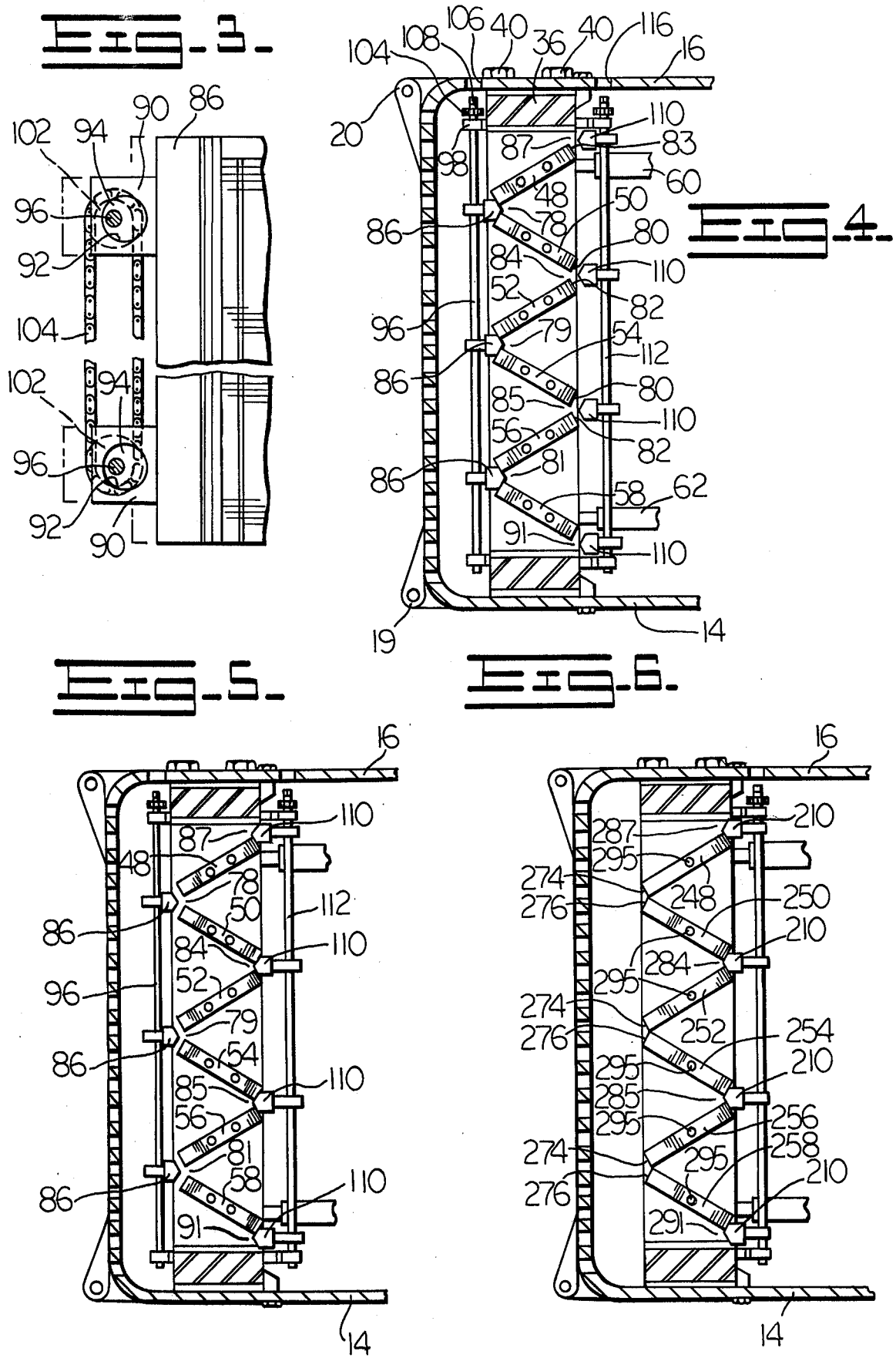

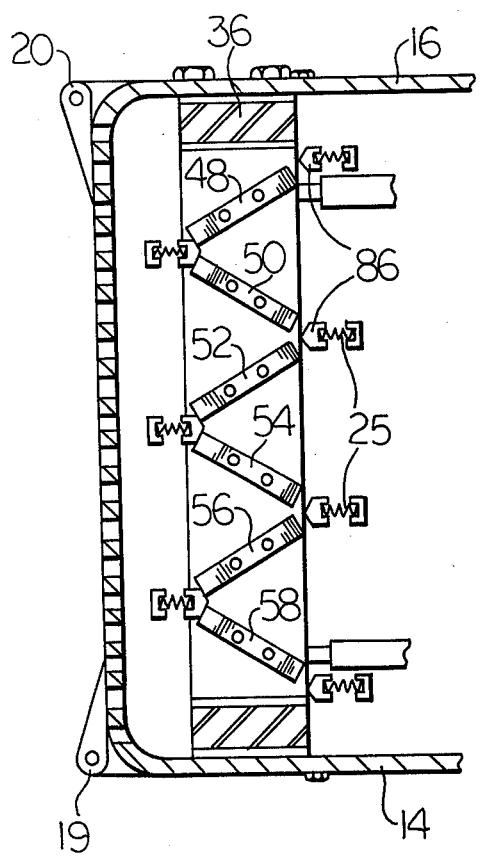
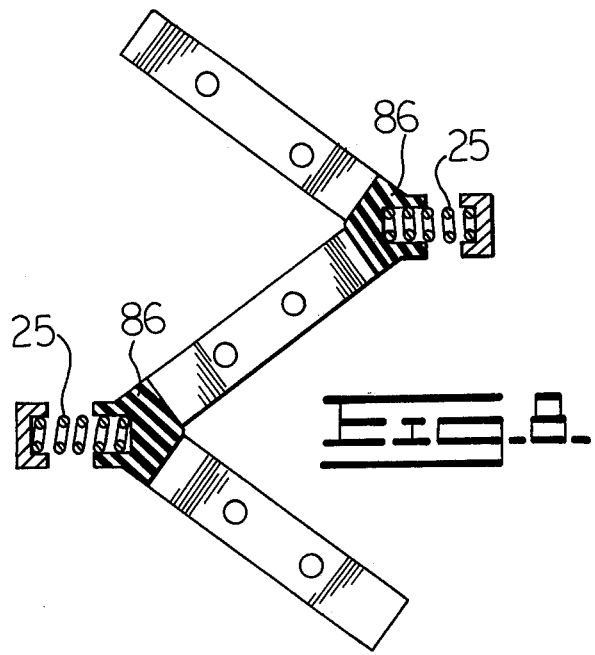

HEAT EXCHANGER HAVING CONTROLLABLE CLEANING MEANS

BACKGROUND OF THE INVENTION

Heat exchangers particularly in the form of a radiator when used on vehicles that are operated in rough terrain, such as on earthmovers, tractors and the like, are subject to core clogging when operating in areas where large amounts of dirt, dust and debris, such as leaves, twigs, grass and the like, are airborne due to the working of the terrain by the vehicles. Under these conditions, the conventional single core heat exchanger frequently becomes clogged with the debris and its effective cooling is materially reduced.

Several systems have been adopted and tried for cleaning the debris from the radiator cores without the need for shutting down the equipment to make physical cleaning of the radiator possible. One such system calls for mounting screens on the upstream side of the radiator cores, which screens can be cleaned automatically or manually. This system permits a certain amount of debris to go through the screens, eventually plugging the cores.

A second well-known system provides for the fan on the vehicle being reversible so that in addition to drawing air through the radiator, the fan can be reversed and will act as a blower for blowing air back through the radiator, presumably to flush the debris from the fins and from the radiator core.

A third system is to provide a folded core heat exchanger whereby the core of the heat exchanger is divided into a plurality of smaller cores or sections which cores or sections are angularly mounted with respect to each other across the front of the engine to provide a plurality of V-shaped troughs into which the cooling air is drawn. Gaps are provided between each core at the apex of the V-shaped troughs through which air is continuously bled carrying with it the debris from the surface of the cores. This system functions less than desirably in requiring extra air flow to accomplish the cooling required. The additional air flow requires increased fan power and produces increased noise levels.

The present invention is directed to overcoming one or more of the problems as set forth above.

According to the present invention, a heat exchanger has at least one cooling core pair with each cooling core having first and second opposed sides and first and second edges. Means are provided for maintaining adjacent cores of a core pair angularly oriented one from the other. The first edges of the core pair are spaced one from the other. Closure means is provided for controllably opening and closing the space between said first edges of said core pair.

BRIEF DESCRIPTION OF THE DRAWINGS

FIG. 3 is a partial cross-sectional view taken along the lines 3—3 of FIG. 2;

FIG. 4 is a view similar to FIG. 1 only showing the rear plugs in a gap-opening position;

FIG. 5 is a view similar to FIG. 4 only with the plugs advanced to open the front gaps of the heat exchanger;

FIG. 6 is a modified form of the invention employing only rear gap opening and closing plugs; and FIGS. 7 and 8 show another embodiment of the plugs.

DESCRIPTION OF THE PREFERRED EMBODIMENT

Figure 1:
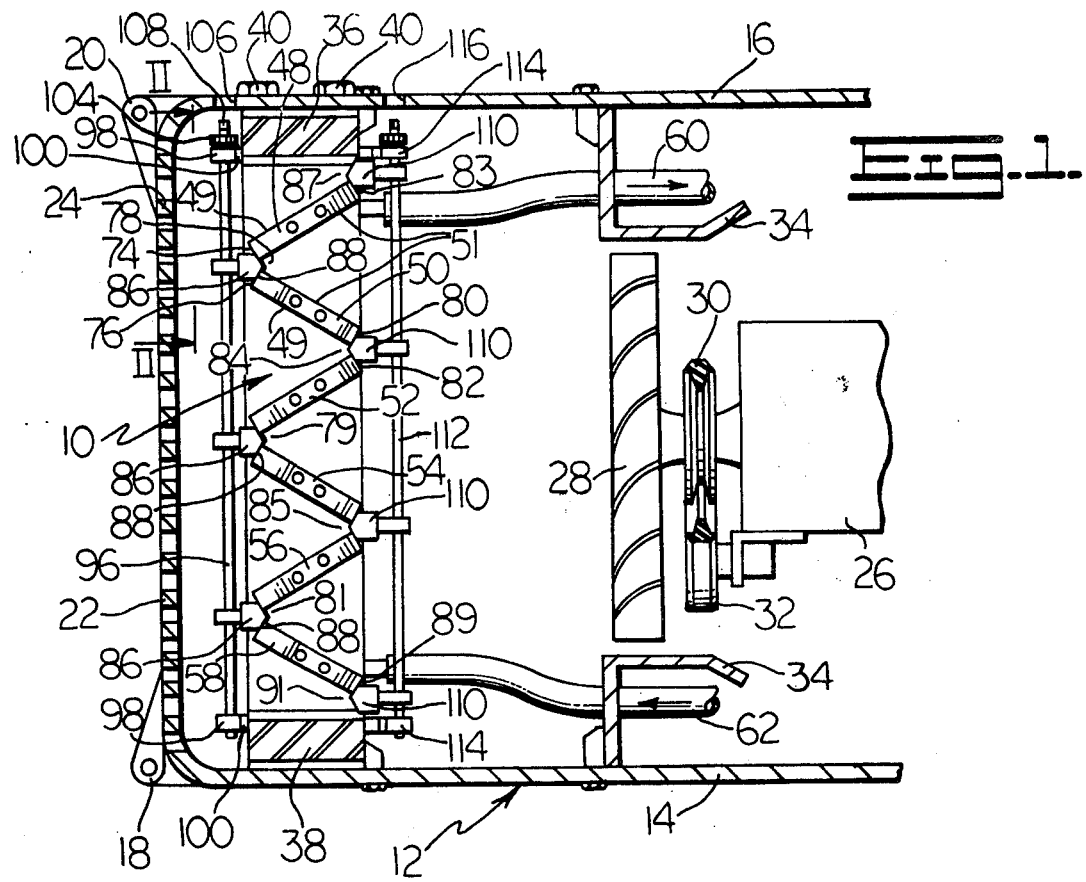
FIG. 1 is a plan view, partially in section, showing a preferred embodiment of the invention on the engine of a vehicle, such as an earthmover.

FIGS. 1 through 5 show a front-mounted cooling system 10 installed on the front end of a vehicle 12, such as a crawler tractor, earthmover or the like. It is understood that the design and construction of the present invention has wide application in surface-type heat exchangers where air is forced or drawn over the fins and cores containing coolant for cooling an engine or other heat-producing instrumentality, for example, an oil system, a cooling system of an internal combustion engine, or a refrigeration system, so as to reduce the temperature of the coolant.

As illustrated, the heat exchanger is a radiator associated with the engine of a work vehicle. The work vehicle 12 has a frame with a pair of spaced apart side walls 14 and 16, each of which pivotally supports by means of hinges 18 and 20, front grills 22 and 24, respectively. An engine 26, such as a liquid-cooled internal combustion engine, is mounted on the frame between the walls 14 and 16 and has a fan 28 driven by a belt 30 and pulley 32 on the front end thereof. The frame of the vehicle has baffles 34 carried by the walls 14 and 16, which baffles surround the fan 28 so as to guide the flow of air from the front of the vehicle through the fan and on past the engine.

Extending between the side walls 14 and 16 and mounted thereto by means of resilient pads 36 and 38, respectively, and fasteners 40, is the radiator or heat exchanger 10 which comprises a top or header tank 44, a bottom tank 46 and a plurality of angularly oriented modules, sections or cores 48, 50, 52, 54, 56 and 58. The engine is cooled by a liquid coolant which is circulated by a pump (not shown) and is communicated through pipe 60 to the top tank 44 of the heat exchanger 10. The liquid coolant, which comes from the engine, is at an elevated temperature and is circulated through the sections, modules or cores 48, 50, 52, 54, 56 and 58 where the temperature of the coolant is reduced by air flowing past the fins on the cores. The cooled coolant flows from the sections or cores into the bottom tank 46 and back to the engine 26 through the pipe 62. The sections or cores 48, 50, 52, 54, 56 and 58 are all substantially identical and are of a conventional design having a plurality of through tubes which have attached thereto a plurality of radiating fins 64.

Each pair of adjacent cores, such as cores 48 and 50, have a generally planar front surface 49 and a generally planar rear surface 51. The radiator or heat exchanger 10 has a vertical plane which lies perpendicular to the longitudinal centerline of the vehicle 12. Adjacent sections or cores 48 and 50 have their front surfaces 49 angularly disposed with respect to the vertical plane of the radiator or heat exchanger 10 and with respect to each other such that each pair of sections or cores 48, 50 converge toward each other to form a V-shaped or wedge-shaped trough therebetween. In the case of cores 48 and 50, the wedge-shaped trough points toward the front of the vehicle with the leading edges 74, 76 of the cores 48 and 50, respectively, spaced apart horizontally to form a vertical gap 78 therebetween. The adjacent cores 50 and 52 converge toward each other rearward of the vehicle 12 so that the apex of the "V" or of the wedge-shaped trough is rearward of the heat exchanger 10. The trailing edges 80, 82 of the cores 50 and 52 are spaced horizontally a short distance from each other so as to form a vertical space 84 therebetween. Cores 52 and 54 and 56 and 58 will form wedge-shaped troughs therebetween with the leading edges 74, 76 thereof pointing forward of the vehicle and being spaced apart to form spaces 79 and 81 therebetween similar to the space 78 between cores 48 and 50. Cores 54 and 56 converge rearwardly to form a wedge-shaped trough and have the trailing edges 80 and 82 spaced horizontally apart to form a vertical space 85 therebetween similar to the vertical space 84 between cores 50 and 52. Between the trailing edge 83 of core 48 and the side of the heat exchanger 10 is a space 87 and, likewise, between the trailing edge 89 and the side of the heat exchanger 10 is a space 91.

Figure 2:
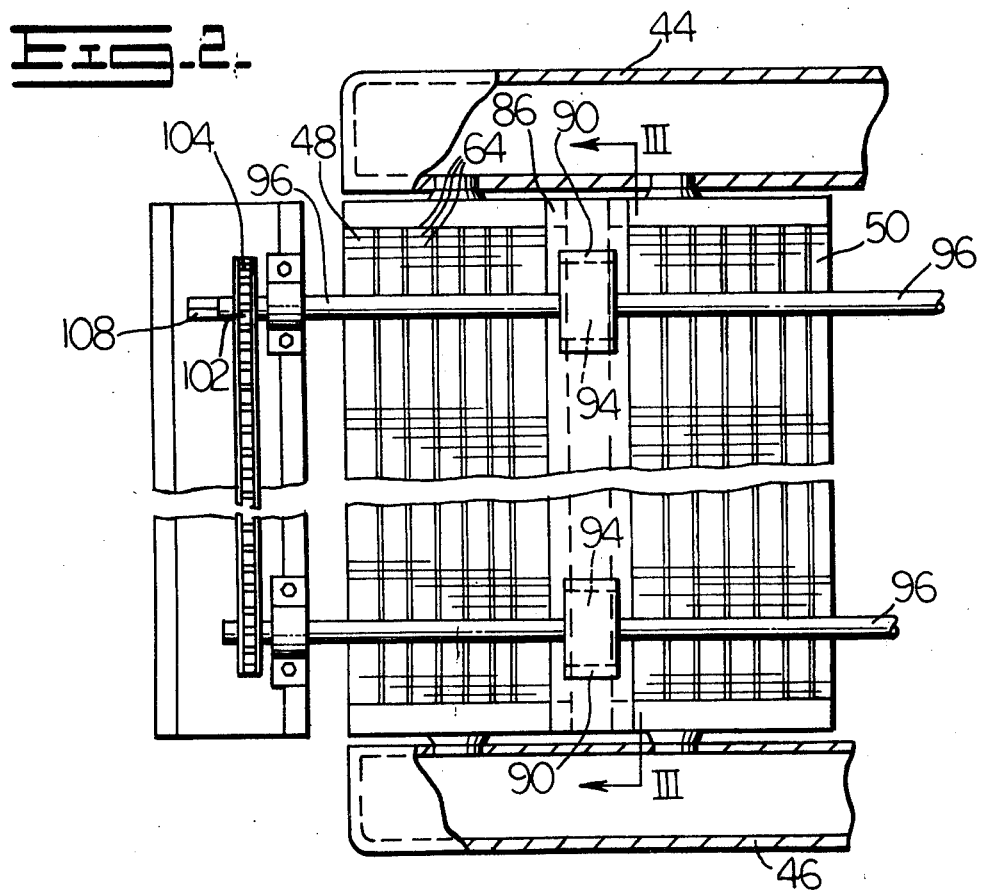
FIG. 2 is a partial cross-sectional view taken along the lines 2—2 of FIG. 1.

As shown particularly in FIGS. 1, 2 and 3, the gaps 78, 79 and 81 between the converging, adjacent cores 48, 50, 52, 54 and 56, 58 are adapted to be closed by movable plugs 86 mounted forward of the leading sides 74, 76 of the cores. The plugs 86 are vertically elongated and have an angled contact face 88, somewhat conforming to the shape of the leading sides 74, 76 of the cores 48, 50, 52, 54 and 56, 58 and are adapted to engage the leading sides 74, 76 of said cores 48, 50, 52, 54 and 56, 58 throughout the vertical height thereof so as to close the spaces 78, 79 and 81 therebetween. The plugs 86 are mounted on vertically spaced apart plates 90 which have circular openings or cam followers 92 therein. The plates 90 and openings 92 of each upper and each lower plate are horizontally aligned. A circular disc or cam 94 is seated in the openings 92 in the plates or cam followers 90 with a common shaft 96 passing through the discs or cams 94 offset from the centers thereof. The shaft 96 is fixed to each circular disc or cam 94 and is rotatably mounted in bearings 98 in the brackets 100 fixed to the side walls 14, 16 of the heat exchanger 10. Each closure means or plug 86 has a pair of said plates or cam followers 90 which are vertically spaced apart and have a pair of shafts 96 affixed to the discs or cams 94 rotatably mounted in the openings 92 in said plates or cam followers 90. A sprocket 102 is fixed on each shaft 96 which sprockets are encircled by a chain 104. An opening 106 is provided in the side wall 16 of the vehicle 12 in which a crank (not shown) can be passed for engagement with a shaped end 108 of the shaft 96 so that upon turning the crank, the circular discs or cams 94 in the plates or cam followers 90 are rotated for moving the plugs 86 from a closed position, as shown in FIG. 1, to an open position, as shown in FIG. 5, or vice versa.

Mounted along the trailing sides 83, 80, 82 and 89 of the cores 48, 50, 52, 54 and 56, 58 are four plugs 110 which are movably mounted on a shaft 112 which shaft, in turn, is mounted on brackets 114 on the side walls 14, 16 such that a crank (not shown) inserted through an opening 116 in the side 16 when turned will move the plugs 110 from a closed position (FIG. 1) to an open position (FIG. 4) or vice versa. The operation of the plugs 110 opening and closing mechanism is the same as for opening and closing plugs 86. It should be understood that any appropriate mechanism for moving the plugs 86, 110 from a closed to an open position or the reverse is acceptable, the present system being shown for illustration purposes, but not for limitation purposes. The mechanism could be a remotely controlled motorized system without departing from the spirit of the invention.

FIGS. 7 and 8 show plugs 86 that are biased to the closed position by biasing means 25, such as, for example, a spring. The biasing means 25 are of a preselected tension to open under a preselected force.

In normal use, the plugs 86 and 110 will be in space closing position, as shown in FIG. 1, such that use of the vehicle with the fan 28 operating to draw air through the heat exchanger 10, will draw air through the first surfaces of cores 48, 50, 52, 54, 56 and 58 for cooling the coolant in the radiator. The air will be somewhat compressed in the wedge-shaped troughs, such as between the cores 50 and 52 and between the cores 54 and 56, and will force its way through the cores, over the fins 64 and on out the rear of the heat exchanger. Periodically, the crank will be used to open the rear gaps 87, 84, 85, 91 by moving the plugs 110 rearward to open the gap 87 between the core 48 and the end wall, the gap 84 between the cores 50, 52, the space 85 between the cores 54, 56 and the space 91 between the core 58 and the end wall. Continued use of the vehicle will pull the air through the grill and over the heat exchange cores and, due to the spaces 87, 84, 85, 91 being open between the adjacent cores, will permit the air not only to flow through the fins, but also to purge the debris from the fins and from the cores and out through the spaces 87, 84, 85, 91. After an appropriate period of time of running the engine and the fan with the gaps 87, 84, 85, 91 open, the plugs 110 will be moved to the closed position and the engine operated in the normal manner.

Under certain conditions, the fan 28 of the engine 26 can be reversed to blow air forward through the heat exchanger 10 from the rear. This condition is illustrated in FIG. 5 where the forward shaft 96 has been turned so as to move the plugs 86 forward from the leading sides 74, 76 of the cores 48, 50, 52, 54, 56, 58 to open the spaces 78, 79, 81 between the adjacent cores, such as between the cores 48, 50, 52, 54 and 56, 58, respectively. The reverse flow of air from the fan 28 will blow air back through the fins 64 and through the cores 48, 50, 52, 54, 56, 58 of the heat exchanger 10 and will blow debris that has accumulated on the cores of the heat exchanger 10 forward of the heat exchanger. Any debris behind the cores will be blown through the gaps 78, 79, 81 at the leading edges of the cores. At the appropriate time after the debris on the heat exchanger has been purged, the forward plugs 86 will be closed and the engine will be operated in its usual manner with the fan 28 pulling air through the radiator from the front of the vehicle.

In one modified form of the invention, such as shown in FIG. 6, only rearward plugs 210 are used. In this case, the engine is usually not adapted for reverse driving of the fan 28, and accordingly, it is only necessary to purge the debris from the heat exchanger by moving the plugs 210 rearward of the cores so as to open the spaces 287, 284, 285, 291 between the converging core 248 and the side wall, between converging cores 250, 252, 254, 256 and converging core 258 and the other side wall so as to purge the debris therefrom. The corners of the leading sides 274, 276 of said cores 248, 250, 252, 254 and 256, 258 will just touch to prevent air and debris from passing therethrough.

The cores 248, 250, 252, 254, 256 and 258 could be of the reversible movement type whereby the cores could be rotated about trunnions 295, for instance, in a counterclockwise direction, as viewed in FIG. 6, to permit air purging of the surfaces of the cores. The cores can then be returned to their normal position and further purged by opening the spaces 287, 284, 285, 291 between the converging cores by moving the plugs 210 rearward from said spaces 287, 284, 285, 291.

The improvement contemplates the provision of plugs 86, 110 for opening and closing spaces 78, 79, 81 and 87, 84, 85, 91, respectively, at the converging apexes of the folded cores 48, 50, 52, 54, 56, 58 of a folded core-type heat exchanger to permit purging of debris from the surfaces of the heat exchanger cores.

The embodiments of the invention in which an exclusive property or privilege is claimed are defined as follows:

1. A heat exchanger, comprising:
    at least one cooling core pair, each cooling core having first and second opposed surfaces and first and second edges;
    means fixedly maintaining adjacent cores of a core pair angularly oriented and spaced one from the other, said first edges of said core pair being spaced a first preselected distance one from the other and the second edges of said core pair being spaced a second preselected distance one from the other, said first preselected distance being less than said second preselected distance; and
    closure means for controllably opening and closing the space between said first edges of said core pair.

2. In a heat exchanger, as set forth in claim 1, wherein said closure means comprises a plug having a contact face of a configuration sufficient to mate with the adjacent first edges of said cores.

3. In a heat exchanger, as set forth in claim 2, including a cam follower means carried by said plug and a shaft having a cam cooperating with said cam follower means and being of a construction sufficient for displacing said plug relative to said cores.

4. In a heat exchanger, as set forth in claim 1, wherein there are a plurality of core pairs each positioned with the second edges of adjacent cores of adjacent core pairs being spaced one from the other and including closure means for controllably opening and closing the space between adjacent second edges of the cores of adjacent core pairs.

5. In a heat exchanger, as set forth in claim 1, including means for connecting the cores to an internal combustion engine.

6. In a heat exchanger, as set forth in claim 1, including means for connecting the cores to an oil cooling system.

7. In a heat exchanger, as set forth in claim 1, including means for connecting the cores to a refrigeration system.

* * * * *